July 3, 1945.  P. F. SMITH  2,379,758

PARACHUTE CONSTRUCTION

Filed March 11, 1942

INVENTOR.
PREVOST F. SMITH.
BY Albert Sperry
ATTORNEY

Patented July 3, 1945

2,379,758

UNITED STATES PATENT OFFICE 2,379,758

PARACHUTE CONSTRUCTION

Prevost F. Smith, Manchester, Conn., assignor to Pioneer Parachute Company, Inc., Manchester, Conn., a corporation of Connecticut Application March 11, 1942, Serial No. 434,224

7 Claims. (Cl. 244—145)

My invention relates to parachutes and methods of producing the same and particularly to constructions whereby shock loading is reduced and the manner of descent stabilized.

Shock loading of a parachute occurs when the canopy first opens. Prior to opening of the canopy the parachute and user fall freely and may be traveling at very high speed due to the velocity of the aeroplane from which the parachutist has leaped. As soon as the canopy opens the descent is checked and the rate of descent may be decreased from say 200 or 300 feet per second to about 15 feet a second within a period of about 5 seconds. This rapid deceleration causes the user, harness and suspension lines to be subjected to very severe strains and the user is sometimes seriously injured. This condition is aggravated in parachutes as heretofore constructed by the expansion of the canopy during shock loading to a diameter considerably exceeding that which it subsequently assumes during normal descent. Thus, for example, a parachute which is 24 feet in diameter will have an effective diameter of about 21 feet on shock loading but will have an effective diameter of only about 16 to 17 feet during normal descent. The effective area of the canopy during shock loading is therefore approximately 50% greater than its normal area during descent and the rate of deceleration is proportionately increased. The period during which shock loading takes place is thereby shortened with resulting increase in the strains and shock to which the user is subjected.

Another objection to parachutes of the prior art arises from their instability during descent due to the tendency of the parachute to spill air from the upper edge when it swings from side to side. In rough air, such as a strong wind, such parachutes sometimes swing so high and spill so much air that they partially collapse. Each time air is spilled in this manner it allows the user to drop and since he drops off center, a pendulum action is produced and the manner and rate of descent is rendered unstable and hazardous.

In accordance with my invention these objections to constructions of the prior art are overcome by restricting expansion of the skirt of the canopy and thus preventing it from spreading out to a diameter exceeding that of normal descent. The limited diameter of the canopy during shock loading prolongs and reduces deceleration and the strains placed upon the suspension lines and harness. This action materially decreases the shock to which the user is subjected since the rate of descent is checked more gradually and over a longer period of time. Moreover, the restriction of the skirt produces a cup-like formation at the edge of the canopy preventing ready escape or spilling of the air when the parachute swings from side to side so that oscillations of the parachute are rapidly damped out and easy stable descent is effected.

While some attempts have been made heretofore to attain the advantages of my invention by providing a "formed" canopy in which the width of the gores or sections of fabric adjacent the skirt is reduced to produce a restricted cup-shaped skirt, such constructions have eliminated the balloon effect or outward bellying of the fabric at the skirt and between the suspension lines. The effective area of the parachute is thus reduced by nearly 20% and it is for this reason that parachutes of this type are notorious among parachutists for their fast descent and hard landings. Moreover, the stretching of the fabric to a taut condition near the skirt tends to cause the fabric to tear or to pull at the seams.

In the preferred form of my invention herein shown and described the restricting means are attached to the canopy adjacent the suspension lines while leaving the portions of the skirt between the suspension lines free to belly outward as in the ordinary parachute construction. At the same time the restricting means are so formed and connected to the canopy as to render it unnecessary to use the usual loop of webbing to reinforce the skirt and prevent tearing of the fabric in the event a line is thrown outward and upward over the canopy.

One of the objects of my invention is to provide a novel type of parachute construction which serves to reduce shock loading thereof.

Another object of my invention is to improve the stability of descent of parachutes.

A further object of my invention is to provide a parachute with means for restricting expansion of the skirt of a parachute canopy while avoiding reduction in the effective area of the parachute during normal descent.

These and other objects and features of my invention will appear in the following description thereof in which reference is made to the preferred embodiment thereof shown in the drawing.

Figures 3, 6:
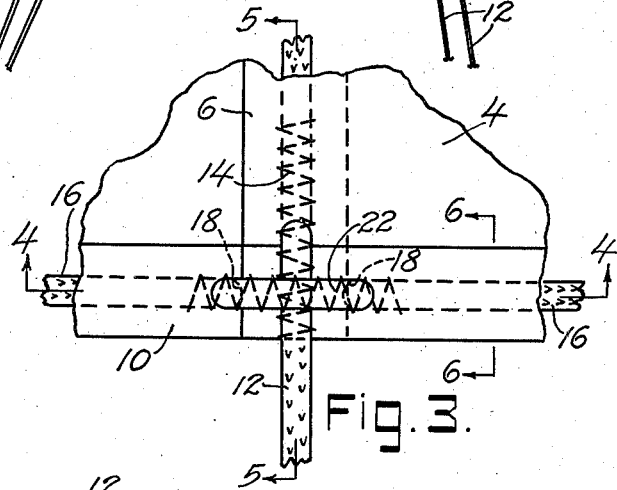
Fig. 3 is a plan view of a detail of the construction shown in Fig. 1.
Figure 4:
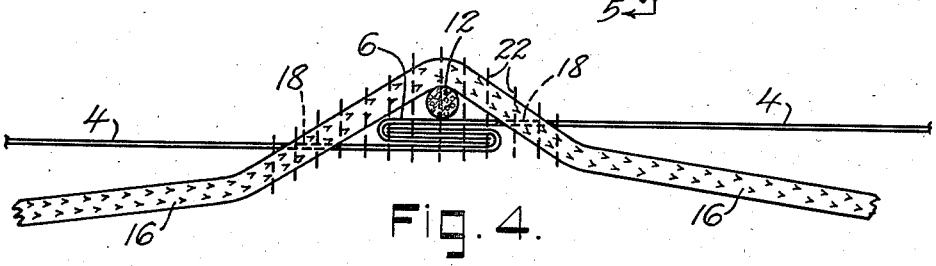
Figure 5:
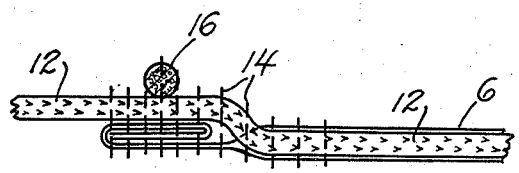

Figs. 4, 5 and 6 are sectional views of the construction illustrated in Fig. 3 taken on the lines 4—4, 5—5 and 6—6 respectively of Fig. 3.

In that form of my invention chosen to indicate the nature thereof and shown in the figures of the drawing, the parachute is provided with a canopy 2 formed of a plurality of sections or gores of fabric 4 which are joined together along the seams 6. The canopy may be of the usual flat type or of any other construction, but preferably is provided with a restricted vent and is of the type shown and described in my copending application Serial No. 432,213 filed Feb. 25, 1942, now matured into Patent 2,356,493.

The fabric extending along the edge of the skirt 8 of the canopy is formed with a hem 10 as in the usual method of constructing parachutes. Suspension lines 12 which support the user or object carried by the parachute extend over the canopy and pass through the seams 6 as shown more clearly in Figs. 3 and 5. The suspension lines 12 are also secured to the fabric of the seams 6 and hem 10 by suitable means such as the zig-zag stitching indicated at 14 in Fig. 3.

In order to prevent unrestricted expansion of the skirt of the canopy during shock loading of the parachute and in order to produce a cup-like formation of the canopy adjacent the skirt, restricting means are provided to extend from one suspension line to the next completely about the circumference of the canopy and preferably directly adjacent the skirt on the interior of the canopy. As shown in Fig. 4 the restricting means employed is in the form of a strong line 16 which extends from the interior of the skirt through the opening 18 in the hem 10 on one side of the suspension line 12, and then passes over suspension line and pleat 6 and through a second opening 18 in the hem on the opposite side of the suspension line. The restricting line 16 then passes on to the adjacent suspension line leaving the portion 20 of the skirt between the suspension lines free to belly outward when the parachute is in use. The restricting line is secured in place adjacent the pleat 6 and hem 10 and over the suspension line 12 by means of zig-zag stitches or otherwise as indicated at 22 in Figures 3 and 4.

In this way the restricting line 16 passes completely about the skirt of the canopy in the interior thereof so that the suspension lines are prevented from spreading apart to expand the skirt, while the fabric 20 between the suspension lines is free to expand outward and is not stretched taut or subjected to adverse strains. The effective area of the canopy is increased considerably by the addition of the area enclosed between the loops in the skirt and the restricting lines and therefore the effective area of the canopy is not reduced below that of the usual parachute construction and the rate of descent of the parachute is not increased by reason of the restricting means employed. However, shock loading of the parachute is reduced and deceleration prolonged by preventing the canopy from expanding further than is necessary to insure subsequent descent at a safe speed.

With the arrangement shown and described the restricting line 16 overlies the suspension line 12 at the edge of the canopy and is securely attached to the outer face of the skirt and therefore the restricting line holds the suspension line firmly in place preventing the suspension line from being torn loose from the fabric in the event it is thrown outward or upward over the top of the canopy. This arrangement of the restricting line makes it unnecessary to use the usual loop of webbing which has heretofore been provided for reinforcing the skirt adjacent the point where the suspension line passes therefrom.

The length of the restricting line may be varied but is generally about two-thirds the length of the circumference of the canopy when fully extended. Thus in a typical example when the canopy is 24 feet in diameter or about 75 feet in circumference the length of the restricting line should be such as to hold the points in the skirt adjacent the suspension lines to a maximum of about 16.5 feet in diameter and is approximately 50 feet in length. The restricting line is of sufficient strength to prevent breaking thereof on expansion of the canopy under condition of shock loading of the parachute. Therefore, instead of expanding to approximately 21 feet in diameter at which time it would have a total effective area of about 320 square feet, as is usual during shock loading of a 24 foot parachute not having any restricting means, the skirt is restricted to about 16.5 feet in diameter with the fabric between the suspension lines further extended about one foot on each side so that the canopy has a total effective area of only about 240 square feet during shock loading and during subsequent descent. Deceleration and shock loading are thus materially decreased and prolonged and the strains on the suspension lines and harness, and the shock to the wearer are greatly reduced insuring the safety and comfort of the user. Moreover, after shock loading and during normal descent of the parachute the effective area of the canopy is undiminished by reason of the restricting means used since the fabric at the points 20 between the suspension lines is free to belly outward and thus serves to increase the effective area of the canopy from 15 to 20% over that of a "formed" canopy of equal diameter.

Figure 1:
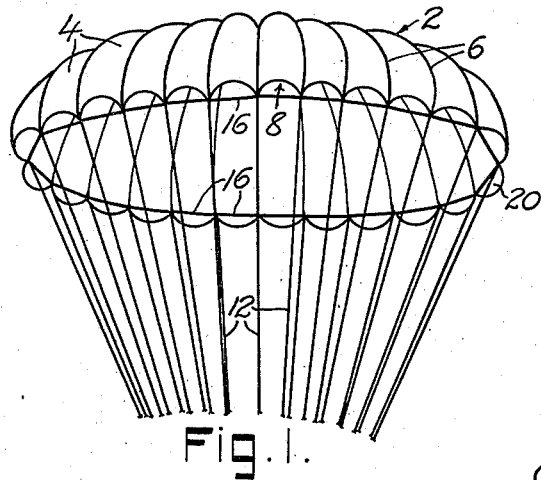
Fig. 1 is a perspective view of a parachute embodying a preferred form of my invention as seen when looking upward into the opened canopy of the parachute.
Figure 2:
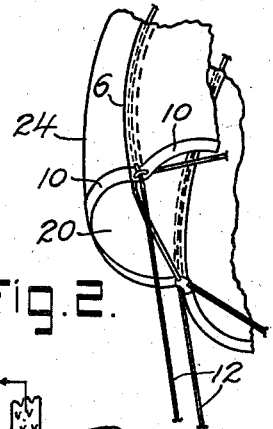
Fig. 2 is an enlarged view of a portion of the canopy shown in Fig. 1.

The restricting of the suspension lines and skirt of the canopy serve during normal descent to hold the skirt in and produce a cup-shaped formation of the canopy adjacent the skirt as shown at 24 in Fig. 2. This shaping of the canopy retains the air within the skirt when the canopy swings from side to side and but very little air is spilled even in a strong wind. The sudden drops, collapsing and swinging of the parachute are reduced and oscillations are quickly damped out so that safe, stable descent is effected.

While I have shown and described a construction in which the restricting line is fixedly secured to the suspension lines and fabric of the canopy adjacent the skirt, it will be apparent that the restricting line may be attached to the suspension lines alone or may be attached to the skirt alone. Further, if desired, the stitching of the restricting line to the skirt may be omitted and the line may be passed loosely through the skirt adjacent the suspension lines so as to permit slippage between the suspension lines and restricting line to distribute strains extending circumferentially of the canopy.

These and other changes in the construction and method of applying restricting means to parachutes in accordance with my invention may be made without departing from the spirit and scope thereof and it should therefore be understood that the preferred embodiment of my invention shown in the drawing and described above is intended to be illustrative of my invention and is not intended to limit the scope of the following claims.

I claim:

1. In a parachute having a canopy formed of a plurality of panels secured together with their portions of greatest width located adjacent the skirt of the canopy, means for reducing shock loading of the parachute comprising flexible restricting means extending about the interior of the canopy and fixedly secured thereto at spaced points adjacent the skirt of the canopy said means being sufficiently shorter than the maximum expanded circumference of the skirt to limit expansion of the canopy during shock loading of the parachute to a diameter substantially equal to that which the canopy would assume under conditions of normal descent if said restricting means were not present.

2. In a parachute having a canopy with suspension lines extending beyond the skirt thereof, a hem of material formed along the edge of the skirt and extending beneath the suspension lines, and restricting means extending from one suspension line to the next about the interior of the canopy and adjacent the skirt, said suspension lines being secured to said hem and said restricting line passing over the suspension line and being secured to said hem by stitching passing through both of said lines and said hem so as to hold the suspension lines in engagement with the hem, whereby the restricting line prevents tearing of the hem by the suspension lines in the event they should be thrown outward and upward over the canopy.

3. In a parachute having a canopy with a hem about the skirt thereof and a plurality of suspension lines secured to said hem and extending from the canopy, a restricting line passing about the interior of the canopy from one suspension line to another, said restricting line extending from the interior of the canopy through a hole in said hem adjacent one side of a suspension line and passing over said suspension line and back through a hole in the hem adjacent the opposite side of the suspension line, and stitching securing said suspension and restricting lines together and to said hem, said restricting line being substantially shorter than the circumference of said canopy when fully extended whereby the restricting line serves to prevent undesired expansion of the canopy during shock loading of the parachute and prevents the suspension line from tearing the hem of the canopy in the event it should be thrown outward and upward over the canopy.

4. In combination with a parachute canopy embodying a plurality of tapered fabric sections joined together at their edges and having the portions thereof of greatest width located adjacent the skirt of the canopy, means for reducing shock loading of the canopy comprising a flexible and substantially inelastic restraining member connected to the parachute at spaced points adjacent the skirt, said member being of a length substantially equal to the sum of the distances between the said spaced points of connection when they assume the positions of normal descent whereby it serves to impose substantially no restriction to expansion of the skirt under conditions of normal descent, and of a length substantially less than the sum of the widths of said fabric sections adjacent the skirt of the canopy whereby undesired expansion of the canopy under shock loading is prevented.

5. In combination with a parachute canopy embodying a plurality of tapered fabric sections joined together at their edges and having the portions of greatest width located adjacent the skirt of the canopy, means for reducing shock loading of the canopy comprising a flexible and substantially inelastic restraining member extending about the interior of the canopy and connected thereto at spaced points, said member being of a length substantially equal to the sum of the distances between the said spaced points of connection when they assume the positions of normal descent whereby it serves to impose substantially no restriction to expansion of the skirt under conditions of normal descent and of a length substantially less than the sum of the widths of said fabric sections adjacent the skirt of the canopy whereby undesired expansion of the canopy under shock loading conditions is prevented.

6. In combination with a parachute canopy embodying a plurality of tapered fabric sections joined together at their edges and having the portions of greatest width located adjacent the skirt of the canopy, means for reducing shock loading of the canopy comprising a flexible and substantially inelastic restraining member connected to the canopy at spaced points thereon, the length of that portion of said restraining member between any two adjacent points of attachment being not less than the distance between such points during normal descent of the parachute.

7. In combination with a parachute canopy embodying a plurality of tapered fabric sections joined together at their edges and having the portions of greatest width located adjacent the skirt of the canopy, means for reducing shock loading of the canopy, comprising a flexible and substantially inelastic restraining member connected to the canopy at spaced points thereon, the length of that portion of said restraining member between any two adjacent points of attachment being less than the distance which would exist between such points when said canopy is subjected to shock load in the absence of said restraining means.

PREVOST F. SMITH.